United States Patent [19]

Paginton

[11] 4,113,070
[45] Sep. 12, 1978

[54] BRAKE ACTUATOR

[75] Inventor: Philip Norman Paginton, London, England

[73] Assignee: Westinghouse Brake & Signal Co. Ltd., London, England

[21] Appl. No.: 816,133

[22] Filed: Jul. 15, 1977

[30] Foreign Application Priority Data

Aug. 11, 1976 [GB] United Kingdom ............... 33701/76

[51] Int. Cl.² ............................................. F16D 65/56
[52] U.S. Cl. ................................... 188/196 F; 188/203
[58] Field of Search ........... 188/153 R, 196 D, 196 F, 188/202, 203

[56] References Cited

U.S. PATENT DOCUMENTS

| | | | |
|---|---|---|---|
| 2,160,859 | 6/1939 | Grayson | 188/196 F |
| 3,432,011 | 3/1969 | Altherr | 188/203 |
| 4,005,767 | 2/1977 | Farello | 188/203 |

Primary Examiner—Duane A. Reger
Attorney, Agent, or Firm—Larson, Taylor and Hinds

[57] ABSTRACT

A brake actuator comprising: a piston-cylinder arrangement having a piston member and a cylinder member arranged for sliding motion relative to one another by fluid pressure medium; an elongate plunger longitudinally movable by one said member and comprising two mutually screw-threaded parts arranged to vary the effective or overall length of the plunger upon relative rotation of said two parts; a resilient spring torque motor for effecting said relative rotation, the torque motor being coupled to one of the parts for driving that part relative to the other part; and rotation preventing means comprising friction clutch or brake members coupled to said one part and releasable when the stroke of the plunger exceeds a pre-set or predetermined amount to permit torque transmission from the torque motor to said one part in a direction tending to increase the effective or overall length of the plunger.

6 Claims, 1 Drawing Figure

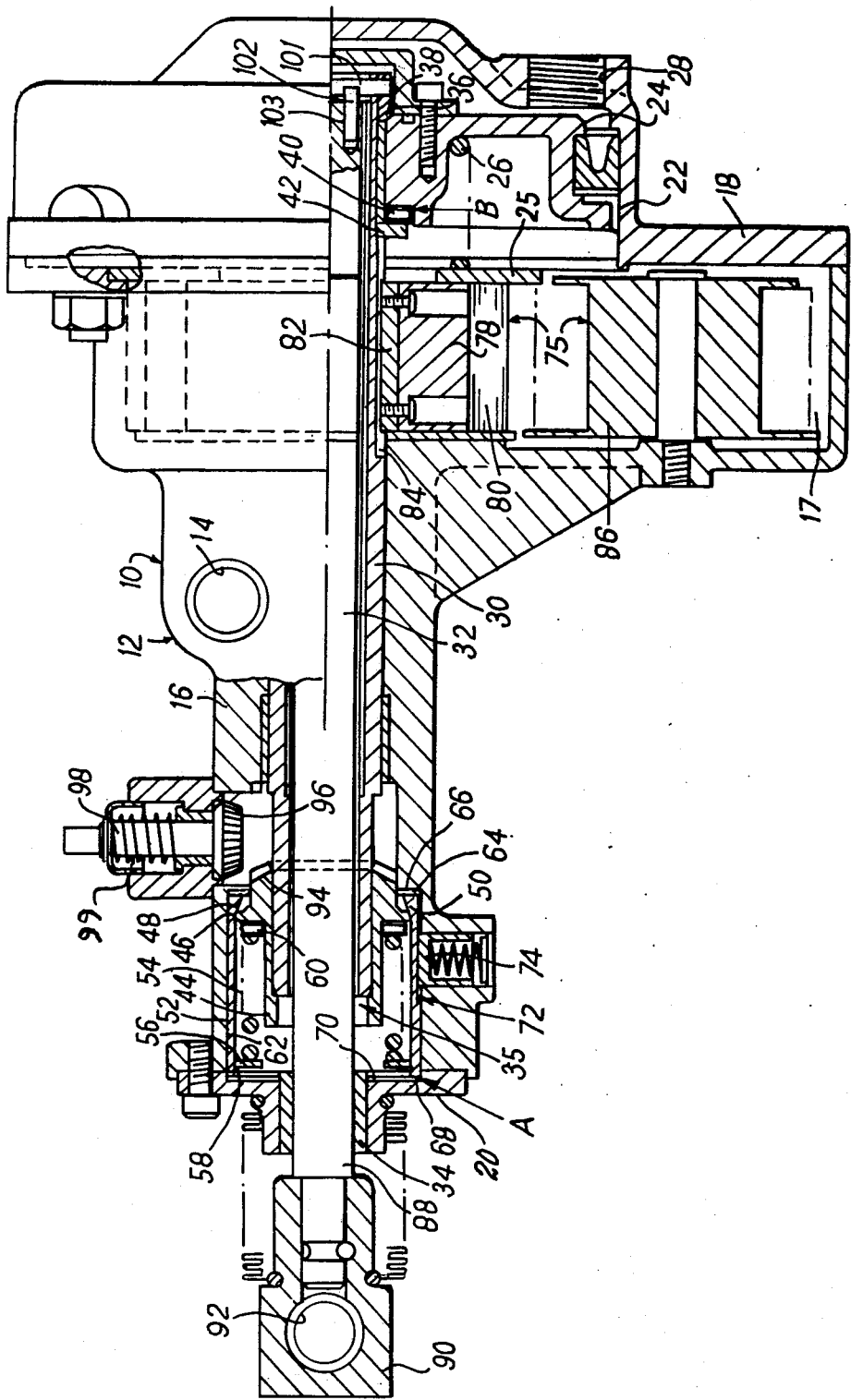

BRAKE ACTUATOR

This invention relates to brake actuators, particularly but not exclusively for railway vehicles.

BACKGROUND TO THE INVENTION

The normal clearance between the brake pad(s) or brake block(s) and the disc or drum or wheel frictionally engageable thereby, generally increases with progressive wear of the pad(s) or block(s) that arises from repeated brake applications. This clearance increase or "slack" must be traversed before the brakes can be applied. With so-called "slack adjusters" currently in use the total stroke of the device is measured, i.e., the sum of the normal clearance plus the deflection of the rigging mounting components of the brake. When this total stroke as measured becomes too great, it is reduced by a predetermined fixed amount. This precludes the use of such "slack adjusters" where very small clearances are required.

SUMMARY OF THE INVENTION

It is thus desirable to provide means that can automatically adjust for or take up "slack" in variable increments so that small clearances can be maintained and yet be capable of making very large adjustments per operation.

According to this invention there is provided a brake actuator comprising: a piston-cylinder arrangement having a piston member and a cylinder member arranged for sliding motion relative to one another by fluid pressure medium; an elongate plunger longitudinally movable by one said member and comprising two mutually screw-threaded parts arranged to vary the effective or overall length of the plunger upon relative rotation of said two parts; a torque motor for effecting said relative rotation, the torque motor being coupled to one of the parts for driving that part relative to the other part; and rotation preventing means coupled to said one part and releasable when the stroke of the plunger exceeds a pre-set or predetermined amount to permit torque transmission from the torque motor to said one part in a direction tending to increase the effective or overall length of the plunger.

Preferably the releasable rotation preventing means comprises frictional engagement means, e.g. clutch or brake means.

Advantageously the plunger is movable by the piston member.

Preferably, the torque motor comprises resilient energy storage means, e.g. a tensator (i.e., comprising a spring composed of two oppositely coiled portions).

DESCRIPTION OF THE DRAWING

By way of example, one embodiment of this invention will now be described with reference to the accompanying drawing which is a partial longitudinal cross-section through a brake actuator according to this invention in the position adopted when the brake is released.

DESCRIPTION OF A PREFERRED EMBODIMENT

As shown, the brake actuator 10 comprises a housing 12 provided with a pin hole 14 whereby the brake actuator is to be mounted in the rigging system of a railway vehicle brake. The housing 12 has a hollow main body 16 having a cavity 17 at one end which is closed by a cap 18, and the main body 16 is provided at its other end with an end plate 20. The cap 18 provides internally a cylinder member 22 in which an annular piston member 24 is reciprocally slidable. A compression coil spring 26 acts between the piston member 24 and a plate 25 partially covering the cavity 17 to urge the piston member 24 towards the base or bight portion of the cap 18 (i.e., to the right as viewed in the drawing). This base or bight portion of the cap 18 is provided with a threaded port 28 for connection to a conduit to supply a fluid pressure medium, e.g. compressed air or hydraulic fluid, to the brake actuator. The annular piston member 24 encompasses one end of an internally threaded elongate tube 30 which is screw-threaded about an elongate rod 32 extending through the end plate 20. The screw-threaded engagement of the tube 30 and the rod 32 is by means of a self-locking type of thread which generates no torque when acted upon by an axial force. The rod 32 is mounted slidably and irrotatably in a sleeve 34 provided centrally of the end plate 20. To provide the irrotational mounting of the sleeve 34 and the rod 32, they are provided with at least one pair of cooperating flat surfaces; conveniently the rod 32 is of D-shaped cross-section adjacent the sleeve 34 which has an internal aperture of corresponding and mating D-shaped cross-section.

The piston member 24 is urged by the spring 26 into contact with a ring 36 secured to the adjacent end of the tube 30, the contacting surfaces being bevelled and, when mutually engaged, providing a high coefficient of friction between them to form a cone clutch or brake 38. The spring 26 also urges the piston member 24 away from an annular thrust bearing 40 and annular thrust ring 42 in contact with one another and encompassing the tube 30, the annular thrust ring 42 being secured to the tube 30. The gap "B" between the thrust bearing 40 and the adjacent radial face of the piston member 24 is made as small as practicably possible so as to minimize the distance through which the piston member 24 is to travel before it causes the elongate plunger 35 (constituted by tube 30 and rod 32) to travel. The opposite end of tube 30 is surmounted by sleeve 44 irrotationally secured thereto, e.g. by a press fit. The sleeve 44 is externally provided with a frusto-conical surface 46 engaging an internal, mating, frusto-conical surface 48 of a tubular member 52. The surfaces 46, 48 when mutually engaged provide a high coefficient of friction between them so as to form a cone clutch or brake 50. The surfaces 46, 48 are urged into mutual engagement by a coiled compression spring 54 acting between a washer 56 that is retained by a circlip 58 at one end of the tubular member 52, and a thrust bearing 60 engaging an external shoulder of the sleeve 44.

The tubular member 52 is housed in a cylindrical recess 62 in the main body 16 of the housing 12 and has its inner radial end urged (by the action of spring 26 acting via piston 24, cone clutch or brake 38, tube 30, sleeve 44 and cone clutch or brake 50) towards, and normally against, a thrust washer 64 abutting a radial end wall 66 of the recess 62. The outer free end 68 of the tubular member 52 is spaced a predetermined distance "A" from a recessed radial wall surface 70 of the end plate 20. This distance or gap "A" is equivalent to the desired normal clearance between the brake pad(s) or block(s) and the disc or drum or wheel of the brake to be operated by the brake actuator 10. Variation of this clearance gap "A" may be provided for different applications of the brake actuator 10, e.g. in one or more of the following ways:

(a) one of several different end plates 20 having different depths of recessed radial wall surface 70 may be selected during assembly;

(b) one of several different tubular members 52 having different axial lengths may be selected during assembly;

(c) a single tubular member 52 of variable axial length may be pre-set to a desired fixed value during assembly;

(d) one or more shims of appropriate thickness may be interposed during assembly between the end plate 20 and the adjacent end of the housing's main body 16.

The outer cylindrical surface of the tubular member 52 is provided with ratchet teeth 72 engageable by a spring loaded pawl 74 mounted in the main body 16. The arrangement of the pawl and rachet teeth is such as to prevent rotation of the tubular member 52 in the same direction as that adopted by elongate tube 30 when the latter is rotated to extend the rod 32 with respect thereto. Such rotation of the tube 30 is achievable by means of a torque motor 75 constituted by resilient energy storage means disposed in the cavity 17 of the housing main body 16. The resilient energy storage means or torque motor 75 has the form of a tensator comprising a spring 80 composed of two oppositely coiled portions, the turns of one portion being wound in one direction about a spool or bobbin 78 encompassing the tube 30 and keyed thereto by a key 82 engaged in a longitudinal slot 84 formed in the outer periphery of the tube 30 (with the innermost turn of said one portion secured to the spool 78), and the turns of the other portion being wound in the opposite direction about a spool or bobbin 86 disposed in the cavity 17 adjacent the spool or bobbin 78 (with the innermost turn of said other portion secured to the spool 86). The output of the tensator is provided by the spool or bobbin 78 as a constant output torque to the tube 30 irrespective of the fraction of the total length of spring 80 on the spool or bobbin 78. When this output torque is allowed to be transmitted to the internally screw-threaded tube 30 to rotate the latter with respect to the externally screw-threaded rod 32 (which is held irrotatably by the sleeve 34 of end plate 20), the effect is to extend the rod 32 with respect to tube 30 so that the free end 88 of the rod 32 is moved axially further away from the housing end plate 20. Thus the effective length of the plunger 35 constituted by tube 30 and rod 32 is increased.

The free end 88 of the rod 32 is connected to a coupling member 90 having a pin hole 92 to receive a pin for connecting the coupling member 90 to means supporting the brake pad(s) or block(s) of the railway vehicle brake.

In the illustrated brake-released condition of the brake actuator 10, rotation of tube 30 by the torque motor 75 is prevented by the action of the cone clutches or brakes 38 and 50 and the forces acting thereon due to the springs 26 and 54.

To operate the brakes, fluid pressure medium, e.g. compressed air, is supplied to the conduit connected to the port 28 which causes the piston member 24 to move slidingly away from the base or bight portion of cap 18 (i.e., leftwards in the view of the drawing) against the action of the spring 26. As the piston member 24 moves through a distance equal to the gap "B", it disengages the cone clutch or brake 38 and, via thrust bearing 40 and thrust ring 42, initiates movement of the plunger 35. Although cone clutch or brake 38 is disengaged, the constituent parts of plunger 35, namely tube 30 and rod 32, can not rotate relative to one another by action of the torque motor 75 because the tubular member 52 is restrained against such rotation by the pawl and ratchet arrangement 74, 72 and is held in frictional non-slipping engagement with the sleeve 44 by the cone clutch or brake 50 that is held engaged by the spring 54. As the plunger 35 moves, it carries with it the sleeve 44 and tubular member 52 that are held engaged by the cone clutch or brake 50 under the action of spring 54. Movement of these components continues until the axial excursion of plunger 35 equals the pre-set or predetermined clearance gap "A", whereupon the outer free end 68 of the tubular member 52 abuts the recessed radial wall surface 70 of the end plate 20.

If the clearance between the brake pad(s) or block(s) and the disc, drum or wheel engageable thereby is correct at the nominal value "A", then further movement of the plunger 35 causes deflection of the brake's rigging system resulting in application of the brake, and (by moving sleeve 44) also causes the clutch or brake 50 to be disengaged whereby torque can be freely applied from the torque motor 75 to the tube 30. However, rotation of the tube 30 by such torque application is prevented and does not occur because of the axial load from the brake and rigging system acting on the interengaged screw threads of tube 30 and rod 32. Accordingly as the brake is applied, strain energy is stored in the rigging system.

On initial release of the brake, this axial load is reduced and the strain energy is recovered as the piston 2 begins to move in the reverse or retracting direction to release brake application. If no wear of the brake pad(s) or block(s) has occurred during brake application, cone clutch or brake 50 re-engages simultaneously with the force on the brake pad(s) or block(s) attaining a low value (of the order of a few hundred, e.g. 200–500, lbs.) and thereby prevents rotation of tube 30 by the torque motor 75. If, however, wear of the brake pad(s) or block(s) has occurred during brake application, the force acting thereon attains the low value before cone clutch or brake 50 re-engages so that there is no restraint on the torque motor 75 rotating tube 30. Accordingly, such rotation occurs in a direction giving rise to an increase in the overall or effective length of the plunger 35 (whereby the sleeve 44 moves relatively away from rod end 88) until the surface 46 of sleeve 44 engages the surface 48 of tubular member 52, i.e., until the cone clutch or brake 50 is re-engaged, whereupon such rotation ceases. In this way, the entire amount of wear is taken up or adjusted for during release of the brake.

With the cone clutch or brake 50 engaged and thereby preventing relative rotation of tube 30 and rod 32, continued release of the brake allows the return spring 26 to move the piston member 24 towards its illustrated brake-released position in which it effects re-engagement of the cone clutch or brake 38 and consequently retracts plunger 35 and engaged cone clutch or brake 50 until tubular member 52 again abuts against the thrust washer 64 providing a release abutment.

If, for some reason, e.g. upon fitting new brake pad(s) or block(s), there is an excessive clearance between the pad(s) and the disc, drum or wheel engageable thereby, then on application of the brake, the rod 32 will be subjected to virtually no reaction force when the gap "A" has been taken up and the outer free end 68 of tubular member 52 abuts the recessed radial wall surface 70 of end plate 20. Accordingly, further movement of plunger 35 will cause disengagement of cone clutch or brake 50 and allow the torque motor 75 to rotate the tube 30 relative to the rod 32 whereby the latter is moved leftwards (when viewed as illustrated) relative to the tube 30. This movement of rod 32 continues until the brake pad(s) or block(s) engage(s) the disc, drum or wheel with a reaction force sufficient to prevent torque transmission. Further movement of the plunger 35 under the action of piston member 24 produces strain energy in the brake rigging system and the brake is fully applied. It will thus be seen that the brake actuator 10 can, if necessary, take up or adjust for the total take up available in just one application of the brake.

Release of the brake is as described above.

As illustrated, the inner end of the sleeve 44 is provided with a bevel gear 94 engageable by a bevel gear 96 that is mounted on a resetting spindle 98 projecting radially from the housing main body 16. A coil spring 99 urges the bevel gear 96 out of engagement with bevel gear 94. When replacement or renewal of the brake pad(s) or block(s) is required, the overall or effective length of the plunger 35 is reduced to a minimum by manually depressing spindle 98 against the action of spring 99 to cause bevel gear 96 to engage bevel gear 94, and then manually rotating the spindle 98 to effect rotation of tube 30 in a direction resulting in retraction of rod 32 within the tube 30. This rotation of tube 30 is permitted by the pawl 74 and ratchet teeth 72 and simultaneously rewinds the spring 80 of the torque motor or tensator 75 upon the storage spool or bobbin 86. Accordingly, no further adjustment of the torque motor is required and no adjustment is required for clearance between the new brake pad(s) or block(s) and the disc, drum or wheel engageable thereby since such clearance will be automatically set to the appropriate desired value "A" upon first application of the brake.

The resetting mechanism provided by bevel gears 94, 96 and spindle 98 is automatically disengaged, by the action of the spring 99 acting on spindle 98, upon release of spindle 98.

The ring 36 is secured to the adjacent end of tube 30 by a diametral pin 101. A pin 102 projects from an off-centre, longitudinally extending blind bore 103 in the adjacent end of tube 32 so as to contact laterally the pin 101 when the plunger 35 is fully reset so that, at such time, the screw-thread of neither tube 30 nor rod 32 is subjected to axial force. Accordingly a risk of jamming or binding of the threads is obviated or at least minimised. The extent of projection of the pin 102 in relation to the pitch of the screw-threads is such that the free end of pin 102 will pass beside the pin 101 when the tube 30 is rotated through nearly half a turn; in other words the pins 101, 102 will not prevent tube rotation.

It will be appreciated that in the brake-released condition of the brake actuator 10, the cone clutch or brake 38 is engaged under the action of spring 26 and thus prevents relative rotation of the tube 30 and rod 32 as a result of vibration.

From the foregoing, it will be apparent that the above-described and illustrated brake actuator embodying this invention has the capability of making very small adjustments for brake wear yet can also adjust for the total available take up in just one single application and release of the brake.

The above-described and illustrated embodiment of this invention has been provided by way of example only. Other embodiments will be apprent to persons skilled in this art.

Having thus described our invention what we claim is:

1. A brake actuator comprising:
    a piston-cylinder arrangement having a piston member and a cylinder member arranged for sliding motion relative to one another by a fluid pressure medium,
    an elongate plunger longitudinally movable by one said member and comprising two mutually screw-threaded parts arranged to vary the effective or overall length of the plunger upon relative rotation of said two parts;
    a torque motor for effecting said relative rotation, the torque motor being coupled to one of the parts for rotatably driving that part relative to the other part in a direction tending to increase said effective or overall length of the plunger; and
    rotation preventing means coupled to said one part and releasable when the stroke of the plunger exceeds a predetermined or pre-set amount to permit torque transmission from the torque motor to said one part to drivingly rotate the latter in said direction such that the effective or overall length of the plunger is drivingly increased under the action of the torque motor, the increase in length corresponding to the stroke excess.

2. A brake actuator according to claim 1, wherein the releasable, rotation preventing means comprises frictional engagement means.

3. A brake actuator according to claim 1, wherein the torque motor comprises resilient energy storage means.

4. A brake actuator according to claim 3, wherein the resilient energy storage means comprises a tensator including a spring composed of two oppositely coiled portions.

5. A brake actuator comprising:
    a cylinder member to receive a fluid pressure medium;
    a piston member slidably disposed in the cylinder member for movement in a first direction under the pressure of said medium;
    spring means urging the piston member in a direction opposite said first direction;
    plunger means operable by the piston member to effect an excursion, the plunger means comprising an internally-threaded tube having one end adjacent the piston member and an externally-threaded rod in threaded engagement with the tube and projecting longitudinally from the other end of the tube;
    guide means co-operable with the rod to guide it slidably and irrotatably;
    a tensator having a spring composed of two oppositely coiled portions;
    means coupling the tensator to the tube for rotating the latter in a rotary direction such as to effect an extension of the rod from the tube and thereby increase the overall length of the plunger means;
    sensor means movable through a predetermined clearance distance with the plunger means during excursion thereof;
    means holding the sensor means against rotation in said rotary direction;
    first frictional engagement means for frictionally coupling the piston member and the tube under the action of said spring means; and second frictional engagement means for frictionally coupling said sensor means and said other end of the tube so as to prevent rotation of the tube in said rotary direction when engaged but permit such rotation when disengaged due to an excursion of the plunger means greater than said clearance distance.

6. A brake actuator comprising: a variable volume chamber having a wall member movable by a fluid pressure medium; an elongate plunger longitudinally movable by said member and comprising two mutually screw-threaded parts arranged to vary the effective or overall length of the plunger upon relative rotation of said two parts; a tensator comprising two oppositely coiled spring portions to effect said relative rotation, one portion being coupled to one of the screw-threaded parts for rotatably driving it relative to the other of the screw-threaded parts in a direction to increase said effective or overall length of the plunger; and rotation preventing means coupled to said one part and releasable when the stroke of the plunger exceeds a predetermined or pre-set amount to permit torque transmission from the tensator to said one part to drivingly rotate the latter in said direction.

* * * * *